United States Patent [19]
Shimokawa et al.

[11] Patent Number: 5,702,793
[45] Date of Patent: Dec. 30, 1997

[54] MAGNETO-OPTICAL RECORDING MEDIUM, DISK AND METHOD OF MANUFACTURING THE SAME

[75] Inventors: Kenji Shimokawa; Hitoshi Dohnomae; Toshio Mukai, all of Kawasaki; Kengo Shimanoe, Sagamihara, all of Japan

[73] Assignee: Nippon Steel Corporation, Tokyo, Japan

[21] Appl. No.: 201,385

[22] Filed: Feb. 24, 1994

[30] Foreign Application Priority Data

Feb. 25, 1993 [JP] Japan ................................ 5-060884
Mar. 31, 1993 [JP] Japan ................................ 5-096718

[51] Int. Cl.$^6$ ........................................................ G11B 5/66
[52] U.S. Cl. ............... 428/64.3; 428/336; 428/694 ML; 428/694 SC; 428/694 GT; 428/694 MM; 428/900; 369/13
[58] Field of Search ............... 428/694 GT, 694 MM, 428/694 ML, 694 SC, 900, 336, 64.3; 369/13

[56] References Cited

U.S. PATENT DOCUMENTS

| | | | |
|---|---|---|---|
| 4,624,858 | 11/1986 | Capra et al. | 427/523 |
| 4,878,132 | 10/1989 | Aratani et al. | 360/59 |
| 5,168,482 | 12/1992 | Aratani et al. | 369/13 |

FOREIGN PATENT DOCUMENTS

| | | |
|---|---|---|
| 428271 | 5/1991 | European Pat. Off. |
| 485951 | 5/1992 | European Pat. Off. |
| 63-268103 | 11/1988 | Japan |
| 3-93056 | 4/1991 | Japan |
| 3-178105 | 8/1991 | Japan |
| 3-219449 | 9/1991 | Japan |
| 5-101935 | 4/1993 | Japan |

OTHER PUBLICATIONS

Shimokawa, et al., Garnet Bilayer Films for Magneto-Optical Recording Media, 17th lecture meeting of The Magnetics Society of Japan (Figures Only).
Magneto-Optical Recording International Symposium '92, Jour. of The Magnetics Society of Japan, vol. 17 (S1), 1993, pp. 85-88.
Cho, et al., Bi-substituted iron garnet films with fine grains prepared by pyrolysis, J. Appl. Phys. 70(10), 1991, pp. 6301-6303.
Itoh, et al., Double-Layered Garnet Films on Glass Substrate for High Carrier-to-Noise Ratio on Magnetooptical Recording, Jpn. J. Appl. Phys., vol. 31, 1992, pp. 790-792.
Suzuki, et al., Magnetic and magneto-optic properties of Bi-substituted garnet films crystallized by rapid thermal processing, J. Apply. Phys. 67(9), 1990, pp. 4435-4437.
Nakagawa, et al., Crystal Growth Process of Rb-Doped Iron Garnet Films for M-O Recording Prepared by Pyrolysis, Jpn. J. Appl. Phys., vol. 29(9), 1990, pp. 1690-1695.
Kobayashi, et al., Magnetization Process of Exchange-Coupled Ferrimagnetic Double-Layered Films, Jpn. J. Appl. Phys., vol. 20(11), 1981, pp. 2089-2095.
Shimokawa, et al., Jpn. J. Appl. Phys. 17, 1993, Lopc-10, p. 66.

Primary Examiner—Leszek Kiliman
Attorney, Agent, or Firm—Pollock, Vande Sande & Priddy

[57] ABSTRACT

A high density magneto-optical recording medium utilizing a polycrystalline garnet two-layer film. The film thickness of an under layer of the garnet polycrystal on a glass substrate is made 100 nm or less, and a crystal grain diameter of a recording layer formed thereon is made 0.1 μm or less. Furthermore, the under layer is demagnetized at room temperature. With this, a bit having a regular shape can be written, thus reducing medium noise by a large margin.

24 Claims, 3 Drawing Sheets

F I G. 2
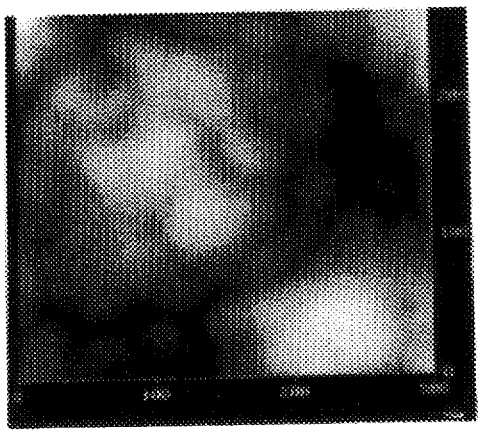

MAGNETO-OPTICAL RECORDING MEDIUM, DISK AND METHOD OF MANUFACTURING THE SAME

BACKGROUND OF THE INVENTION

1. Field of the Invention

The present invention relates to a magneto-optical recording medium and a disk composed of a garnet polycrystalline film and a method of manufacturing the same.

2. Description of the Related Art

Rare earth iron garnet expressed by a basic composition of $R_3Fe_5O_{12}$ (here, R represents a rare earth element containing yttrium) shows much larger magneto-optical effect than an existing rare earth transition metal alloy film in a short wavelength by replacing a rare earth site with Bi. Furthermore, it is possible to write bits by lowering a Curie temperature by replacing an Fe site with a trivalent metal such as Ga and Al, and by heating it with semiconductor laser. Further, being an oxide, garnet shows high corrosion resistance. Such Bi replaced garnet is conceived promising as a medium for high density magneto-optical recording using a short wavelength laser.

When bits are written by heating with a laser in general, correlation between the power of heating laser and the Curie temperature of the medium is important, and the Curie temperature of an existing medium is designed at approximately 100° C. to 200° C. In the case of a garnet crystal, an experiment of writing is also performed with the Curie temperature designed at approximately 100°–200° C. In order to adjust the Curie temperature in a garnet crystal, the iron site is replaced with a trivalent metal such as Ga and Al.

Although a garnet film formed on a single crystal substrate shows high performance, it is indispensable to use a glass substrate which has a large area and is inexpensive when the garnet film is utilized as a magneto-optical recording medium. However, the garnet formed on the glass substrate is a polycrystalline film inevitably, and has such a drawback that medium noise is large due to optical ununiformity originating in a grain boundary. In order to eliminate this drawback, it is indispensable to sufficiently refine a crystal grain diameter as compared with a laser spot. There have been a rapid thermal annealing method (T. Suzuki et al.: J. Appl. Phys. 67(9), 1990, p. 4435) and a method of adding an alkali metal such as Rb (K. Nakagawa et al.: Jpn. J. Appl. Phys. 29(9), 1990, p. 1690) as a method of refining a crystal grain diameter.

The present inventors have achieved refinement of a crystal grain by a method completely different from the method mentioned above. Namely, a magneto-optical recording medium in which a crystal grain in a garnet film of a recording layer is refined down to a submicron order by forming a polycrystalline garnet film having a two-layer construction of a recording layer and an under layer on a glass substrate has been invented (JP-A-5-101935 published on Apr. 23, 1993). In this method, a garnet polycrystalline under layer film is formed directly on the substrate first, and a garnet recording layer film having a lattice constant different by ±0.3% or more is laminated thereon. A crystal nucleus of the recording layer garnet is generated preferentially from an interface between the under layer and the recording layer having low interface energy and the growth of the nucleus is suppressed by lattice distortion due to the difference between the lattice constants, thus realizing a crystal grain at one submicron or below. As to this invention, U.S. patent application Ser. No. 07/791653 is incorporated by reference. Further, Cu having an atomic weight ratio of 5 at % or below (except for oxygen) may be added to the recording garnet layer in order to increase coercive force of the garnet recording layer. The related art is described in JP-A-3-178105.

According to the invention described above by the present inventors, submicron crystal grain garnet usable as a magneto-optical recording medium has been provided. However, the under layer film formed directly on the substrate is still a garnet polycrystalline film having large crystal grains. In order to further reduce medium noise, it has been required to lower the grain boundary noise originating in the under layer.

When layers showing different magnetism are formed into multi-layers in an existing rare earth transition metal amorphous alloy such as TbFeCo, exchange coupling is produced among them (T. Kobayashi et al.: Jpn. J. Appl. Phys. 20(11), 1981, p. 2089). Reports have been made on overwrite (e.g., JP-A-63-268103 and JP-A-3-219449), improvement of recording density (JP-A-3-93056) and so on utilizing such magnetic coupling. In rare earth iron garnet, it is possible to control a Curie temperature, a compensation temperature, coercive force and a Faraday rotation angle by replacing the iron site with a nonmagnetic element such as Ga and Al. However, the effect of magnetism of the under layer exerting on the recording characteristics of the garnet polycrystalline two-layer film is an unexamined subject, and it has been unknown what type of magnetism of the under layer is effective to the shape and the size of a writing bit.

After the invention of a two-layer film made by the present inventors, various types of two-layer films have been proposed. Cho et al. has made a report on refinement of crystal grains with a two-layer film of $Y_{1.5}Bi_{1.5}Fe_5O_{12}/Y_{2.5}Bi_{0.5}Fe_{4.5}O_{12}$ (J. Cho et al.: J. Appl. Phys. 70(10), 1991, p. 6301). Itoh et al. formed the second layer of fine crystal grains by a sputtering method on an under layer showing fire crystal grains of $Bi_{1.0}Dy_{2.0}Fe_{4.0}Al_{1.0}O_{012}$ refined by adding Rb (A. Itoh et al.: Jpn. J. Appl. Phys. 31, 1992, Part 2, No. 6B, p. L790). Shono et al. have disclosed an embodiment of a two-layer film using the under layer represented by $Y_3Fe_5O_{12}$ (JP-A-5-62835 published on Mar. 12, 1993). However, no report has been made on the study of the effect on the recording characteristics due to film thickness, flatness and magnetism of the under layer of a two-layer film which are important for refinement.

SUMMARY OF THE INVENTION

In view of the foregoing, it is an object of the present invention to further reduce medium noise in a polycrystalline garnet two-layer film in which an upper layer (a recording layer) has a crystal grain diameter of submicrons order. It is another object to provide low noise two-layer film medium and disk capable of writing an small bit of 0.5 μm or less in size having a regular shape which is indispensable for high density recording. Further, it is still another object to provide a manufacturing method for realizing the foregoings. Here, the composition of polycrystalline garnet is represented by $Bi_xR_{3-x}M_yFe_{5-y}O_{12}$ ($0 \leq x \leq 3$, $0 \leq y \leq 5$, R represents one or more types of rare earth elements or yttrium, and M represents one or more types of elements replaceable with iron).

In order to achieve above-described objects, in a first recording medium or disk according to the present invention, the under layer film thickness of the polycrystalline garnet two-layer film is reduced down to 100 nm or below (preferably 50 nm or below), and the surface thereof is flattened. A recording layer garnet film of the second layer having a crystal grain diameter of 0.1 μm or less is formed thereon.

Further, in a second recording medium or disk according to the present invention, the Fe site of the garnet under layer film is replaced with a nonmagnetic element such as Ga and Al, the Curie temperature is set to room temperature or below, and a recording layer garnet film of the second layer is formed on such an under layer. The recording or upper layer can have a Curie temperature of room temperature or above.

Furthermore, in a recording medium or disk according to the present invention, the recording layer garnet film having a crystal grain diameter of 0.1 µm or less may be formed using low medium noise under layer in which the thickness thereof is 100 nm or below (preferably 50 nm or below), the surface thereof is flat and the Curie temperature thereof is room temperature or below.

In a recording medium or disk according to the present invention, Cu may be added to a recording layer garnet formed on the under layer in addition to the above.

Further, in a method of manufacturing a recording medium or disk according to the present invention, there is provided one manufacturing method for applying inverse sputtering processing to a garnet under layer formed on a substrate, thereby to realize the low noise magneto-optical recording medium film.

Furthermore, in a recording medium or disk according to the present invention, a reflecting film of Cr, Al or the like may be laminated on the garnet two-layer film.

According to a first recording medium or disk of the present invention as described above, the noise originated in the large grains of the under layer (e.g., 0.5 µm or larger in size) is overcome by making the thickness of the under layer film sufficiently thinner than the wavelength of the using laser (500 nm), the noise due to the scattering of the laser light by the grain boundary of the large grain is suppressed when the thickness of the film is sufficiently thinner than the wavelength of the laser.

Further, since it is possible to demagnetize the under layer at room temperature according to a second recording medium or disk related to the present invention, it is possible to write a bit having a regular shape in the garnet two-layer film.

Furthermore, it is possible to provide a low noise magneto-optical recording medium advantageous for writing a small bit by adding Cu to the recording layer garnet so as to increase the coercive force.

BRIEF DESCRIPTION OF THE DRAWINGS

FIG. 2 shows a photograph, taken by atomic force microscopy, of crystal grains of a recording layer of two-layer film garnet according to the present invention;

DESCRIPTION OF THE PREFERRED EMBODIMENTS

Figure 1:
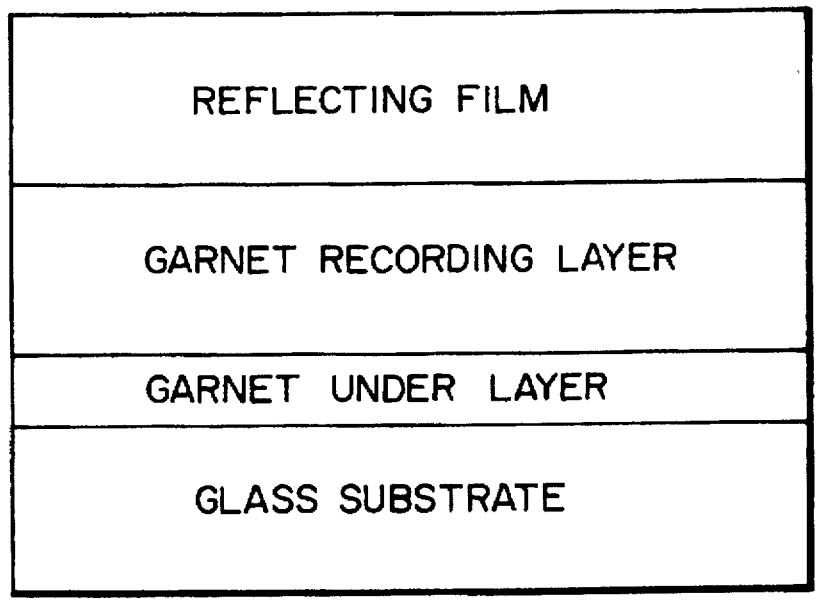
FIG. 1 shows a construction of two-layer film garnet according to the present invention.

First, an outline of the experiment which has become the basis of the present invention will be described.

Besides, a substrate mentioned in the description hereinafter includes a substrate composed of an amorphous substance such as polymer and glass and a polycrystalline substance. The ambient temperature is a temperature when this recording medium or disk is used in a normal environment, and is different depending on district, season or place. Although 20° C. which is a normal room environmental temperature is adopted as an example of ambient temperature for the purpose of explanation hereinafter, the present invention is not limited thereto, but −10° C. to +50° C. for instance can fall within the range of the present invention. Further, the garnet produced by a sputtering method which is a general industrial production method shows a nonstoichiometric composition deviated from a stoichiometric composition ($(RBi)_3$ $(MFe)_5O_{12}$; the total number of atoms of Bi and a rare earth element R is 3, and the total number of atoms of a nonmagnetic element M and Fe is 5). The present invention described hereinafter is also applicable to these garnet films having a nonstoichiometric composition. In particular, when the deviation from the stoichiometric composition is within 5% of the total number of atoms, not so much change is shown in point of characteristics in many cases.

A short wavelength visible light laser having a wavelength of approximately 500 nm is used in high density magneto-optical recording of the next generation. When a crystal grain diameter in the under layer used in the two-layer film is large (e.g., 0.5 µm or more), the laser light scattering due to a crystal grain boundary is suppressed and the noise originating in the under layer becomes very small if the film thickness is sufficiently thinner than the wavelength. Furthermore, when a flat and clean surface of the under layer is utilized, extremely uniform fine crystal grains can be formed in the recording garnet layer on the under layer. In order to reduce the noise originating from the grain boundary of the under layer, it is required to make the thickness of the under layer very thin. In the present invention, nucleation from the interface between the recording layer and the under layer is utilized.

Therefore, the performance of the recording layer garnet film is very sensitive to surface flatness of the under layer. The present inventors have found that the medium noise is reduced by 5 dB (10 dB) in the case of the two-layer film having the under layer film thickness of 100 nm (50 nm) as compared with a two-layer film having the under layer film thickness of 500 nm. Further, it has been impossible to write the bit at 1 µm or less having a regular shape when the crystal grain diameter of the recording layer is larger than 0.1 µm because of insufficient flatness of the under layer. Accordingly, it is required that at least the under layer film thickness is made to 100 nm or less (preferably 50 nm or less) which is sufficiently thinner than the wavelength of recording laser. Further, it is required to make the crystal grain diameter of the recording layer 0.1 µm or less by flattening the under layer.

A garnet film represented by a composition $Bi_xR_{3-x}M_yFe_{5-y}O_{12}$ ($0 \leq x \leq 3$, $0 \leq y \leq 5$, R represents one or more types of rare earth elements or yttrium, and M represents one or more types of elements replaceable with iron) will be described. Exchange interaction among Fe atoms is dominant for the magnetism of the garnet film. The Curie temperature of the garnet film is determined by the energy of exchange coupling thereof. It is possible to increase or decrease the number of connection among Fe atoms thereby to control the Curie temperature by adding Ga, Al or the like which is a trivalent nonmagnetic element replaceable with Fe in garnet. For example, it is possible to make the Curie temperature approximately 20° C. or below when the Fe site having five atoms in the case of y=0 in the above-mentioned composition is replaced by two or more atoms of a non-magnetic element. In the garnet two-layer film for magneto-optical recording, influence exerted on recording characteristics of the two-layer film by the magnetism of the under layer has been scarcely reported. The present inventors have produced two-layer films in which under layer showing various magnetic characteristics are used, thereby to execute recording evaluation. It has also been found that the shape of the bit written in the two-layer film is often irregular when the Curie temperature of the under layer is at room temperature or above. It was possible to write a bit having a regular shape on a garnet two-layer film in which under layer demagnetized at room temperature was used.

Namely, when crystal grains of 0.1 μm in size are formed by forming the film thickness of the under layer in 100 nm or less (preferably 50 nm or less) and flattening the under layer film and the Curie temperature of the under layer film is set to room temperature or below, the medium noise is reduced by a large margin by the synergetic effects of film thickness, flatness and demagnetization of the under layer as described above.

In order to increase the coercive force of the recording layer formed on the under layer, Cu having an element ratio of 5 at % or less (except for oxygen) may be added to the recording layer garnet. Since the size of a writing bit is in reverse proportion to the coercive force, writing small bits, which is advantageous for high density recording, becomes easier as the coercive force gets higher.

An reverse sputtering processing of the under layer is a very effective method for forming a thin, flat and clean under layer surface. In order to form a garnet film on a transparent substrate such as glass, it is required to form an amorphous film first and to crystalize the film by heat treatment. However, it becomes extremely difficult to form a uniform garnet polycrystalline film when the film thickness becomes 100 nm or less. Namely, the time required for crystallization gets very long and a heterogeneous phase is generated easily. Here, the reverse sputtering processing of the under layer is a processing in which rare gas such as argon, oxygen, nitrogen or mixed gas thereof is ionized in plasma, and voltage is applied to these ionized particles thereby to have those particles collide with the under layer film on the substrate. When the reverse sputtering processing is applied to the under layer, component particles forming the under layer film are etched and the under layer film thickness is reduced. At this time, projected portions of unevenness existing on the under layer surface are etched selectively, thus improving the flatness markedly. Furthermore, the reverse sputtering also has a cleaning effect of removing molecules of oxygen, nitrogen, moisture or the like adsorbed on the under layer surface. Namely, extreme thinning, flattening and cleaning of the under layer can be realized at the same time by inverse sputtering.

Examples of the above-mentioned manufacturing method according to the present invention will be shown. (1) First, garnet for an under layer is laminated by a sputtering method. (2) Since the garnet film is formed as an amorphous substance on a glass substrate, it is crystallized by heat treatment. (3) Reverse sputtering is executed onto the under layer crystallized by the heat treatment so as to form the under layer film thickness in 100 nm or less (preferably 50 nm or less) and to flatten the under layer surface. (4) The second garnet layer is laminated by the sputtering method. (5) The second layer is crystallized by heat treatment so as to form garnet crystal grains of 0.1 μm or less in size.

Cr, Al or the like is laminated on a garnet two-layer film as a reflecting film thereby to produce a disk. Such a magneto-optical recording disk can be recorded by magneto-optical drive similar to existing one having incidence and detection of laser light on the same side.

Next, embodiments of the present invention will be described in detail with reference to drawings and photographs.

FIG. 1 shows a construction of a magneto-optical medium according to the present invention. The film was formed by a radio frequency sputtering method. Sputtering of a film was executed in Ar atmosphere at 2 to 30 mTorr using a ceramic target. Applied radio frequency power is 200 to 450W. First, an under layer is formed on the substrate surface. The amorphous film after film formation was crystallized by heat treatment at 650° to 750° C. in mixed gas of argon and oxygen. After the garnet under layer was formed, a sample was installed again in a sputtering apparatus. Reverse sputtering processing was executed by applying radio frequency voltage to the substrate side. The applied radio frequency power is 5 to 300W, and the time of executing reverse sputtering is 1 to 30 minutes. After reverse sputtering processing, the second garnet recording layer was laminated and crystallized by heat treatment at 500° to 650° C. In order to control the Curie temperature of the Under layer film, garnet under layer films having various Al or Ga replacement quantities were produced. In order to evaluate recording characteristics, a reflecting layer (such as Cr and Al) having a thickness of 100 nm was formed on the two-layer film.

Here, when the garnet film is formed, it may be crystallized directly during sputtering by increasing the substrate temperature. The film may be formed by a method other than sputtering (e.g., a vapor deposition method, a laser abrasion method and a sol-gel method).

Embodiment 1

Under layer: $Bi_{0.5}DY_{2.5}Al_{1.1}Fe_{3.9}O_{12}$

Recording layer: $Bi_{2.0}Dy_{1.0}Al_{1.0}Fe_{4.0}O_{12}$: Cu added at 0.1 at % ( film thickness 120 nm)

Figure 3A:
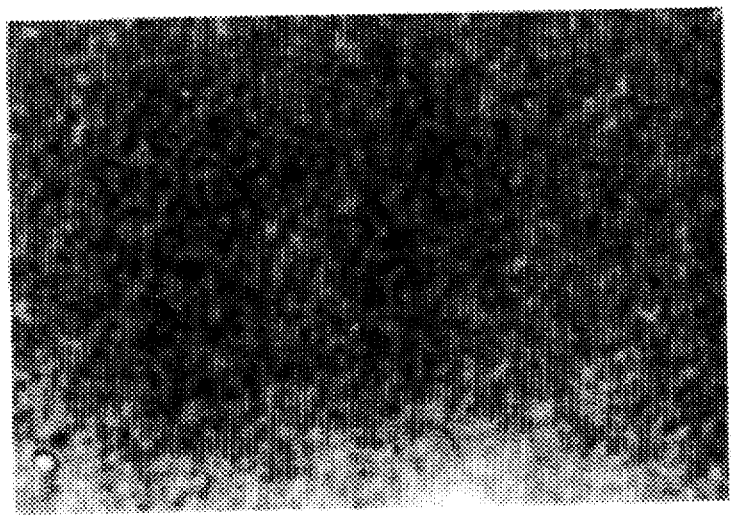
FIG. 3A shows a photograph, taken by polarization microscopy, of a magnetic domain pattern of two-layer film garnet according to the present invention.
Figure 3B:
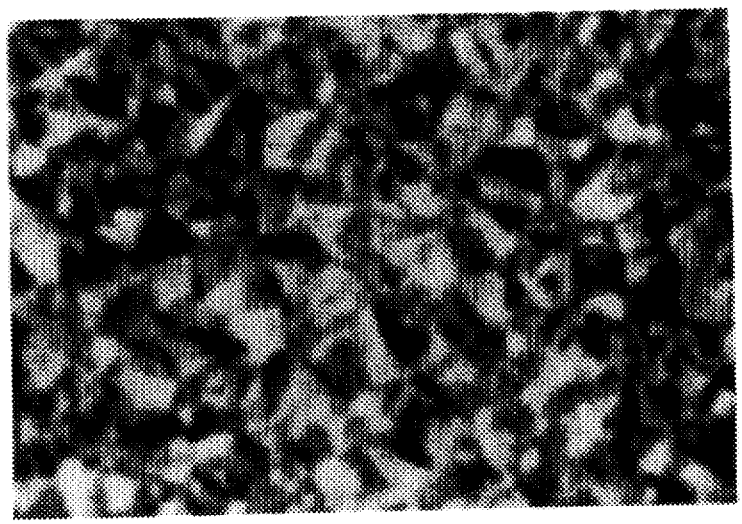
FIG. 3B shows a photograph, taken by polarization microscopy, of a magnetic domain pattern of two-layer film garnet in which inverse sputtering processing has not been executed.

Here, Cu of the recording layer was added for increasing the coercive force. The under layer film was reduced in thickness from 120 nm to 40 nm by inverse sputtering. Further, average roughness of the under layer surface estimated by atomic force microscopy was 3 nm. Furthermore, it was found from a photograph shown in FIG. 2 showing crystal grains taken by atomic force microscopy that the average crystal grain diameter of the recording layer was 0.05 μm. Photographs of domain patterns are taken by polarization microscopy in a case shown in FIG. 3A where the reverse sputtering (applied power: 50W) is applied to the under layer and in a case shown in FIG. 3B where the reverse sputtering is not applied. By applying the reverse sputtering process, a fine and uniform maze pattern of magnetic domain having a width of 0.5 μm or less is observed. Since a magnetic wall is pinned at the crystal grain boundary, this fine (0.5 μm in width) and uniform domain pattern indicates that the crystal grain diameter is sufficiently smaller than at least 0.5 μm. On the other hand, a large and ununiform magnetic domain pattern in several μm is shown in the case of a non-processed film. In the case of a two-layer film using a flat under layer having a film thickness of 40 nm obtained by reverse sputtering, the erasing noise (noise in a state of magnetization in one direction) was reduced by 15 dB as compared with a comparison example in which no processing was made, the surface was rough and the film thickness was 500 nm.

Embodiment 2

Foundation layer: $Bi_{0.7}DY_{2.3}Ga_{2.5}Fe_{2.5}O_{12}$ (Curie temperature <20° C.)

Recording layer: $Bi_{2.0}DY_{1.0}Al_{1.0}Fe_{4.0}O_{12}$

Figure 4:
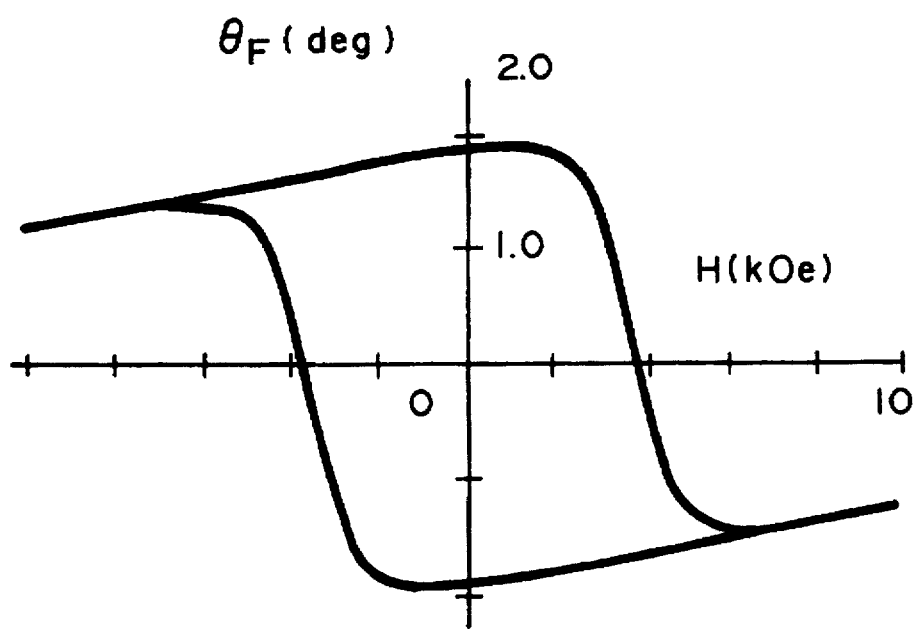
FIG. 4 shows a Faraday hysteresis loop of two-layer film garnet using a nonmagnetic under layer according to the present invention.

Fe was replaced by a large amount of Ga of 2.5 atoms so as to set the Curie temperature of the under layer to below 20° C. (nonmagnetic under layer). The under layer in which the quantity of Ga was small and the Curie temperature was 100° C. or higher was produced as a comparison example (magnetic under layer). In the case of a two-layer film using the nonmagnetic under layer, the write noise (a rise in noise from an erasing noise level by bit writing) was reduced by 15 dB as compared with a case that the magnetic under layer was used. Furthermore, bits having regular shapes were written when nonmagnetic under layer was used. Such a two-layer film shows a hysteresis loop reflecting only the magnetism of the recording layer as shown in FIG. 4.

Embodiment 3

Foundation layer: $Bi_{0.8}DY_{1.9}Ga_{2.8}Fe_{2.5}O_{12}$ (Curie temperature <20° C.)

Recording layer: $Bi_{2.2}Dy_{1.1}Ga_{1.0}Fe_{3.7}O_{12}$: Cu added at 0.1 at %

The under layer film was reduced in thickness from 110 nm to 20 nm by inverse sputtering. The average roughness of the under layer surface was 3 nm, and the grain diameter in the under layer was 0.5 to 1 μm. The difference between lattice constants of the second layer and the under layer was approximately 1%, and the crystal grain diameter in the second (recording) layer was 0.05 μm. By replacing a large amount of Ga, the Curie temperature of the under layer was set to below 20° C. In such a two-layer film, both the erasing noise and the writing noise were small, and a small bit of 0.5 μm having a regular shape could be written. Other embodiments proportionate to Embodiment 3 are collected in Table 1.

Embodiment 4

The second layer film described in Embodiment 3 was formed on a glass disk of 130 mm in diameter with a groove. Cr was laminated in 100 nm on the recording layer. The film thickness of the recording layer was determined so that a product of a Kerr rotation angle and a reflectance became the maximum, and was 125 μm. When recording characteristics were estimated by an argon laser having a wavelength of 488 nm, high characteristics of C/N=51 dB (bit length 4 μm), 48 dB (1 μm) and 45 dB (0.5 μm) were obtained.

The present invention relates to a garnet polycrystalline two-layer film for a magneto-optical recording medium. Here, the garnet polycrystalline film is represented by a composition of $Bi_xR_{3-x}M_yFe_{5-y}O_{12}$ (wherein, $0 \leq x \leq 3$, $0 \leq y \leq 5$, R represents one or more types of rare earth elements or yttrium, and M represents one or more types of metals replaceable with iron). As described in the embodiments, when the under layer film thickness was formed flat and thin in 100 nm or less (preferably 50 nm or less), and a recording garnet layer in which a crystal grain diameter is 0.1 μm or smaller was formed thereon, a two-layer film having a very small erasing noise could be realized. The reverse sputtering processing of the under layer film is effective for forming such a two-layer film. Further, the writing noise was reduced by a large margin by making the Curie temperature of the under layer to show room temperature or below, thus making it possible to write bits of 0.5 μm in size having regular shapes. When Cu was added to the recording layer of the two-layer film, the coercive force was increased, which was advantageous for writing a small bit. The medium noise was reduced by a large margin in a two-layer film in which the under layer was flattened, the film thickness thereof was formed in 100 nm or less (preferably 50 nm or less) and the Curie temperature of the under layer was set to room temperature or below. A disk produced by laminating a reflecting film onto such a garnet two-layer film showed high recording characteristics at a short wavelength. From the foregoing, it is concluded that a garnet polycrystalline two-layer film according to the present invention is effective as a high density magneto-optical recording medium at a short wavelength.

We claim:

1. A magneto-optical recording medium comprising:
   a substrate;
   a first layer of polycrystalline garnet film formed on said substrate, for serving as an under layer, said first layer having a Curie temperature lower than a predetermined temperature, said predetermined temperature being within a range from −10° C. to +50° C., so that said first layer has a non-magnetic characteristic at said predetermined temperature; and
   a second layer of polycrystalline garnet film, formed on said first layer, for recording information, said second layer having a Curie temperature higher than said predetermined temperature so that said second layer has a magnetic characteristic at said predetermined temperature.

2. A magneto-optical recording disk comprising the magneto-optical recording medium according to claim 1 as a component of said disk.

TABLE 1

Composition, grain diameter, film thickness, Curie temperature of under layer

| Foundation composition | Grain diameter (μm) | Film thickness (nm) | Curie temperature (°C.) | Crystal grain diameter of 2nd layer (μm) | Recording characteristics of two-layer film C/N (dB) | Bit shape |
|---|---|---|---|---|---|---|
| $Y_{3.0}Ga_{2.6}Fe_{2.4}O_{12}$ | 0.5–2.0 | 30 | <20° C. | 0.05–0.1 | ≧45 | Regular |
| $Bi_{0.5}Y_{2.5}Ga_{2.5}Fe_{2.5}O_{12}$ | 0.5–2.0 | 40 | <20° C. | 0.05–0.1 | ≧45 | Regular |
| $Bi_{0.7}Gd_{2.3}Al_{2.7}Fe_{2.3}O_{12}$ | 0.5–2.0 | 50 | <20° C. | 0.05–0.1 | ≧45 | Regular |
| $Bi_{0.7}Dy_{2.3}In_{2.7}Fe_{2.3}O_{12}$ | 0.5–2.0 | 50 | <20° C. | 0.05–0.1 | ≧45 | Regular |
| $Bi_{1.0}Tb_{2.0}Ga_{2.8}Fe_{2.2}O_{12}$ | 0.5–2.0 | 20 | <20° C. | 0.05–0.1 | ≧45 | Regular |

* The composition of the second layer is all $Bi_{2.2}Dy_{0.8}Ga_{0.8}Fe_{4.2}O_{12}$.

3. A magneto-optical recording medium according to claim 1, wherein:

said second layer of polycrystalline garnet film has a crystal grain diameter of 0.1 μm or less; and each of said first and second layers of polycrystalline garnet film is represented by a composition of $Bi_xR_{3-x}M_yFe_{5-y}O_{12}$ where R represents at least one rare earth element, M represents at least one element selected from the group consisting of aluminum, gallium and indium, $0 \leq x \leq 3$ and $0 \leq y \leq 5$.

4. A magneto-optical recording medium according to claim 1, wherein:

said first and second layers of polycrystalline garnet film have crystal lattice constants different from each other by ±0.3% or more; and each of said first and second layers of polycrystalline garnet film is represented by a composition $Bi_xR_{3-x}M_yFe_{5-y}O_{12}$ where R represents at least one rare earth element, M represents at least one element selected from the group consisting of aluminum, gallium and indium, $0 \leq x \leq 3$ and $0 \leq y \leq 5$.

5. The magneto-optical recording medium of claim 1 wherein said predetermined temperature is within the range of +20° C. to +50° C.

6. The magneto-optical recording medium of claim 1 wherein said predetermined temperature is +20° C.

7. The magneto-optical recording medium according to claim 3 wherein said rare earth element includes yttrium.

8. A magneto-optical recording disk, comprising the magneto-optical recording medium according to claim 3 as a component of said disk.

9. A magneto-optical recording medium according to claim 3, wherein said second layer of polycrystalline garnet film further includes Cu in an amount of 5 atomic weight percent or less based upon the total of Bi, R, M, Fe and Cu in the composition of said second layer.

10. The magneto-optical recording medium according to claim 4 wherein said rare earth element includes yttrium.

11. A magneto-optical recording disk, comprising the magneto-optical recording medium according to claim 4 as a component of said disk.

12. A magneto-optical recording medium according to claim 4, wherein said second layer of polycrystalline garnet film further includes Cu in an amount of 5 atomic weight percent or less based upon the total of Bi, R, M, Fe and Cu in the composition of said second layer.

13. A magneto-optical recording disk, comprising the magneto-optical recording medium according to claim 9 as a component of said disk.

14. A magneto-optical recording disk, comprising the magneto-optical recording medium according to claim 12 as a component of said disk.

15. A method of manufacturing a magneto-optical recording medium, comprising the steps of:

forming on a substrate a first layer of polycrystalline garnet film for serving as an under layer such that a thickness of said first layer becomes 100 nm or less;

applying reverse sputtering processing to a surface of said first layer of polycrystalline garnet film; and forming on said first layer a second layer of polycrystalline garnet film for recording information such that a crystal grain diameter of said second layer becomes 0.1 μm or less and crystal lattice constants of said first and second layers becomes different from each other by ±0.3% or more.

16. A method of manufacturing a magneto-optical recording medium according to claim 15, wherein each of said first and second layers of polycrystalline garnet film is represented by a composition $Bi_xR_{3-x}M_yFe_{5-y}O_{12}$ where R represents at least one rare earth element, M represents at least one element selected from the group consisting of aluminum, gallium and indium, $0 \leq x \leq 3$ and $0 \leq y \leq 5$.

17. A method of manufacturing a magneto-optical recording medium according to claim 15, wherein said second layer of polycrystalline garnet film includes Cu in an amount of 5 atomic weight percent or less based upon the total of Bi, R, M, Fe and Cu in the composition of said second layer.

18. The method of claim 16, wherein said rare earth element includes yttrium.

19. A method of manufacturing a magneto-optical recording medium, comprising the steps of:

forming on a substrate a first layer of polycrystalline garnet film for serving as an under layer such that a thickness of said first layer becomes 100 nm or less, said first layer having a Curie temperature lower than a predetermined temperature, said predetermined temperature being within a range from −10° C. to +50° C., so that said first layer has a non-magnetic characteristic at said predetermined temperature;

applying reverse sputtering processing to a surface of said first layer of polycrystalline garnet film; and forming on said first layer a second layer of polycrystalline garnet film for recording information such that a crystal grain diameter of said second layer becomes 0.1 μm or less and crystal lattice constants of said first and second layers become different from each other by ±0.3% or more, said second layer having a Curie temperature higher than said predetermined temperature so that said second layer has a magnetic characteristic at said predetermined temperature.

20. A method of manufacturing a magneto-optical recording medium according to claim 19, wherein each of said first and second layers of polycrystalline garnet film is represented by a composition of $Bi_xR_{3-x}M_yFe_{5-y}O_{12}$ where R represents at least one rare earth element, M represents at least one element selected from the group consisting of aluminum, gallium and indium, $0 \leq x \leq 3$ and $0 \leq y \leq 5$.

21. The method of claim 19 wherein said predetermined temperature is within the range from +20° C. to +50° C.

22. The method of claim 19 wherein said predetermined temperature is +20° C.

23. The method of claim 20 wherein said rare earth element includes yttrium.

24. A method of manufacturing a magneto-optical recording medium according to claim 20, wherein said second layer of polycrystalline garnet fill further includes Cu in an amount of 5 atomic weight percent or less based upon the total of Bi, R, M, Fe and Cu in the composition of said second layer.

* * * * *